United States Patent [19]

Sterrett et al.

[11] 4,166,749

[45] Sep. 4, 1979

[54] LOW DENSITY INSULATING COMPOSITIONS CONTAINING COMBUSTED BARK PARTICLES

[75] Inventors: Robert W. Sterrett, Dunwoody, Ga.; Larry S. Shu, Newton Highlands; Robert J. Ostertog, Milford, both of Mass.

[73] Assignee: W. R. Grace & Co., Cambridge, Mass.

[21] Appl. No.: 867,037

[22] Filed: Jan. 5, 1978

[51] Int. Cl.$^2$ ................................................ C04B 7/35
[52] U.S. Cl. .......................................... 106/93; 106/99; 106/109; 106/111
[58] Field of Search ...................... 106/93, 99, DIG. 1, 106/109, 111

[56] References Cited

U.S. PATENT DOCUMENTS

| | | | |
|---|---|---|---|
| 3,403,205 | 9/1968 | Ottenholm | 106/93 |
| 3,827,895 | 8/1974 | Copeland | 106/99 |
| 3,991,005 | 11/1976 | Wallace | 106/DIG. 1 |
| 4,081,283 | 3/1978 | Lankard et al. | 106/DIG. 1 |

Primary Examiner—James Poer
Attorney, Agent, or Firm—William L. Baker; C. Edward Parker

[57] ABSTRACT

Low density cementitious compositions are disclosed which are essentially the hydrated products from mixtures of inorganic hydratable binders such as gypsum and Portland cement with a novel lightweight aggregate material comprised of partially combusted bark particles obtained from bark-burning boiler furnaces of pulp processing concerns. Preferred compositions additionally incorporate conventional additives such as surfactants, fibrous materials, foam stabilizers and conventional lightweight aggregate such as expanded vermiculite to give products useful as lightweight thermal insulation concretes and fireproofings.

23 Claims, No Drawings

LOW DENSITY INSULATING COMPOSITIONS CONTAINING COMBUSTED BARK PARTICLES

BACKGROUND OF THE INVENTION

This invention relates to novel low density compositions having utility for instance as thermal or sound insulating masses as well as fire-proofing coatings for structural steel, etc. The invention more particularly concerns low density compositions produced by hydrating essentially mixtures of inorganic settable binders and a novel lightweight aggregate obtained from combusting essentially the bark obtained as a waste by-product in the processing of logs into useful materials, e.g. pulp for paper products, etc.

Hydratable mixtures of inorganic binders such as gypsum plaster and Portland cement with lightweight open or porous aggregate materials such as expanded vermiculite, expanded perlite, expanded clay, etc. have been used extensively as thermal insulating and fireproofing compositions. Water is added to the mixtures and the wet mix allowed to hydrate or set. The lightweight porous aggregate imparts the desired low density and porosity to the set masses which typically have dry densities of less than about 45, more often less than about 30 pounds per cubic foot. The lowest densities are conventionally obtained by incorporating air into the wet mixtures typically with the assistance of surfactants or foaming agents added to the compositions. The desirability of further including for some applications foam-stabilizing agents, strength-enhancing fibers, etc., is well established in the art.

Practical use of such low density cementitious products as thermal insulating and fireproofing masses often requires that the wet mixtures be pumped distances and thereafter poured or spray-applied. In the use for example of such materials as a lightweight insulating layer in roof decks of commercial buildings, the material typically is mixed at ground level and thereafter pumped vertically to the roof deck. After placement in this fashion, the compositions after hydration must exhibit the desired low density, typically in the range of about 20 to 30 pounds per cubic foot. In similar fashion, low density compositions for fireproofing for example steel structural beams of buildings are mixed, pumped great distances and thereafter sprayed onto the exposed beams. Typical dry densities of hydrated cement/lightweight aggregate fireproofings applied in this manner lie in the range of about 10 to about 25 pounds per cubic foot. There is a continuing need for economic aggregate materials which in particulate form are light in weight and open or porous, yet are sufficiently firm and rigid to withstand compaction by, for example, the extensive mixing and pumping operations required on a large commercial scale.

SUMMARY OF THE INVENTION

In the present invention, a novel aggregate material for use in preparing low density cementitious insulating and fireproofing compositions has been found, which aggregate material comprises the product recovered in particulate form by combusting the bark obtained from logs in the processing of such logs into cellulosic products. The combusted bark product employed herein is the material in particular which is obtained as the result of combusting in a furance the bark obtained from logs, the bark having been first reduced to a desired particle size if necessary before entering the furnace.

In preferred aspects of the invention, the combusted bark particles are utilized in such compositions in combination with other lightweight aggregate materials, surface active agents, fibrous materials, foam stabilizers, etc., to give products ideally suited for use as thermal insulating and fireproofing compositions.

DETAILED DESCRIPTION INCLUDING PREFERRED EMBODIMENTS

The bark product utilized as a low density aggregate herein is, as aforementioned, obtained as a result of combusting the bark removed from logs, after any necessary size reduction, in a furnace. The product is importantly both economic and available in sufficiently large quantity to be practical since it is produced from bark removed as a waste by-product from timber by large concerns such as lumber and pulp and paper manufacturers who process the de-barked timber into useful products. The bark is used by these concerns as fuel in boiler furnaces used to produce steam for power, etc.

The bark typically is initially produced by a conventional "de-barking" operation which removes essentially the outer external covering or "bark" from the timber, although a small amount of the next layer internal of the bark is likely also removed in the rough "de-barking" operations. The bark, if not already of desired size, may be further reduced in size and then fed to the grate of the boiler furnace. The bark as fed to the grate typically has a size of less than about 1 or 2 inches, in some cases about 90% averaging 3/4 inch or less, and contains from about 25 to about 65 percent moisture, typically about 33 to about 58 percent. The bark feed may contain a small percentage of other non-bark wood particles such as scrap wood etc., but in some operations the sized bark feed is essentially free of such materials. Supplemental fuel such as petroleum fuel oil or coal may in some cases be burned with the bark feed.

Air, which may be preheated, is usually always supplied to the furnace and caused to be intimately mixed with the bark particles during combustion. The bark particles may be combusted while dispersed over a grate, or such combustion may take place while the particles are suspended in the combustion air. Combustion temperatures are typically above about 1500° F.

The burning bark in the furnaces produces heated air and hot combustion gases which are caused to exchange heat with water in a well known manner, typically water contained in banks of water tubes which in turn produce the desired steam. As the bark is burned, small particles of partially burned particulate matter are formed. The particles are normally sufficiently light to be suspended in the hot air and combustion gases and even carried along with it. It is these particles of partially combusted bark as collected, for example by baffled hoppers, that are used in the present invention. Since the bark particles are only partially, that is, incompletely combusted, the particles have a residual "b.t.u." value which has led to their previous use in charcoal briquets. Such bark particles have also been used in horticultural growing mixes as disclosed in the copending application U.S. Ser. No. 772,813 of Robert W. Sterrett filed Feb. 28, 1977, now U.S. Pat. No. 4,067,716.

The combusted bark particles in addition to being economic and available in sufficiently large quantities have been found to possess properties which make them especially desirable for use in the present invention. The material as produced is light in weight, has a fairly even particle size distribution as recovered from the furnace presumably due to the fact that it is combusted in small, particulate form, and retains its open or porous structure after mixing and pumping. Moreover the combusted bark particles possess good water holding capacity. The ability of the lightweight aggregate to hold comparatively large amounts of water is believed an important commercial factor in obtaining good "yield", that is low in-place density from a given amount of solid starting product.

The inorganic hydratable binder with which the novel combusted bark aggregate of the invention is combined according to the invention, is any of the inorganic binders conventionally employed in thermal insulating and fireproofing compositions known to the art. Gypsum, i.e. calcium sulfate hemi-hydrate, and Portland cement are most often employed although other cements such as calcium aluminate and magnesia cements might also be employed. Mixtures of such inorganic binders can obviously be used in the present invention.

Sufficient combusted bark aggregate is mixed with the inorganic binder and water to give a product which after hydration exhibits a dry density of less than about 45 pounds per cubic foot. Preferably from about 10 to about 30 pounds per cubic foot. Generally from about 1 to about 50, preferably from about 15 to about 35, percent by weight, based on the composition, of combusted bark is used. Sufficient water is added to make the mix flowable, generally in a weight ratio of water to solids of about 1 to about 2.

A preferred combusted bark product for use herein is a product produced by a commercial pulp processor who combusts bark in a steam-generating boiler, the process employed being essentially as follows.

Bark obtained from pine logs (75% domestic; 25% from Bahamas) by conventional "debarking" procedures is run through a coarse, rugged sizing apparatus ("hog") and collected on a surge hopper. From there, the sized bark is distributed across a travelling grate of a water tube boiler. The distributor is a rotating paddle type (1800RPM) which flings the bark material over the width and length of the grate which travels towards the distributor. The bark feed is free of wood scraps, process waste or other solid fuels. The feed is less than about 1 inch in size and combustion temperature is in the 1900° to 2200° F. range. Oil is added to the bark however as a supplemental fuel. The use of the oil is constant but the amount varies according to the heat load. In the boiler, combustion air is supplied from beneath the grate. As the bark burns, the partially burned particulate matter remaining is carried upwards in the stream of air and combustion gases, and passes out of the boiler through baffled hoppers. The hoppers contain banks of water tubes which extract heat from the gases to produce steam. The baffles in the hoppers, inter alia, provide direction changes of the hot gases which cause particulate matter to drop out. This combusted particulate bark matter is referred to in the Tables below as combusted bark product "A".

Another combusted bark combusted, "B", is also available in the U.S. and may be useable herein. This product is believed to be prepared in a manner similar to that of "A", except that it is burned with particulate coal as a supplemental fuel and is mixed with water as collected from the furnace ("wet-sluiced") and then directed to a settling pond.

The combusted bark products used in the present invention are characterized as aforementioned as very light in weight. The combusted bark products generally possess a dry bulk density, that is, "oven-dry" or essentially moisture-free, bulk density of less than about 17, more typically less than about 10 pounds per cubic foot. Ash contents of the bark ash products may vary according to the particular source of processing, but in general will be found to be less than about 55% as calculated below, preferably less than about 25%.

Typical physical properties of the combusted products "A" and "B" are shown in Table I. For comparison, the same properties for activated and inactivated charcoal samples obtained from Barneby Cheney Co. are shown. The charcoal products are believed to be of coconut shell origin. The activated product is believed to be prepared by high temperature steam treatment of the inactivated product.

The properties tested for in Table I included: *Moisture Content*—calculated by weighing the samples as received and then weighing the sample again after drying the sample overnight (24 hours) at 105° C.; the % moisture shown in Table I is calculated by dividing the loss in weight by the weight of the dried sample and then multiplying by 100; *Ash Content*—the dried sample from the foregoing is ashed at 1200° F. overnight in a muffle furnace; the weight of the heated product (ash) divided by the weight of the dried sample multiplied by 100 gives the ash content; *Dry Bulk Density*—calculated by placing sample in a cylindrical container calibrated by volume and striking the bottom of the container until the sample settles to a constant volume; the sample is then heated at 105° C. overnight to dry it and the dried weight of the sample obtained per unit of volume is calculated in pounds per cubic foot; *Incombustible Residue*—is obtained by multiplying the bulk density by the factor 0.178 to give ash in pounds per cubic foot; *Water Holding Capacity* (W.H.C.)—The volume and weight of a 3 inch pot having openings in the bottom are first determined and the pot then filled to the brim with sample and weighed; the weight of the sample in the pot is then calculated by difference and recorded as "$W_1$"; the filled pot is then placed in water in a container, the water level being equal to the height of the brim, and allowed to soak overnight; the pot is then removed and allowed to drain until no water is seen draining from the openings in the pot; the pot is then weighed and the difference in the weight "$W_2$" divided by the dry weight "$W_1$" multiplied by 100 gives the W.H.C. in the % by weight; W.H.C. in % by volume is measured by dividing the volume of the water by the volume of the dry sample multiplied by 100.

TABLE I

|  | Comb. Bark "A" | Comb. Bark "B" | Inact. Charcoal | Act. Charcoal |
|---|---|---|---|---|
| % Moisture | 182.8 | 143.4 | 6.47 | 5.77 |
| % Ash | 17.8 | 53.6 | 13.7 | 1.87 |
| Incomb. Residue (lbs/ft$^3$) | 1.87 | 8.95 | 2.4 | 0.62 |
| W.H.C. (% wt.) | 417.9 | 228.3 | 138.5 | 68.7 |
| W.H.C. (% vol.) | 70.3 | 61.4 | 20.1 | 41.5 |
| Dry Bulk Density |  |  |  |  |

TABLE I-continued

|  | Comb. Bark "A" | Comb. Bark "B" | Inact. Charcoal | Act. Charcoal |
|---|---|---|---|---|
| (lbs/ft$^3$) | 10.5 | 16.8 | 17.5 | 33.1 |

The ability of the combusted bark particles to hold substantially better than 150, even 200, % by weight of water is particularly noteworthy.

In Table II below, the pH and conductance values of the samples of Table I are shown.

TABLE II

| Sample | pH | Conductance |
|---|---|---|
| A | 6.60 | 0.60 |
| B | 7.85 | 0.20 |
| Inact. Charcoal | 7.30 | 0.36 |
| Act. Charcoal | 9.40 | 1.35 |

A seive analysis of the samples of Table I are shown in Table III below. The analysis is taken of the samples in their "as received" state, i.e., without initially being dried.

TABLE III

| | SIEVE ANALYSIS | | | |
|---|---|---|---|---|
| | Percent Cumulative Retained | | | |
| U.S. Screen | "A" | "B" | Act. Char. | Inact. Char. |
| 1 | 0.6% | 2.0% | 0 | 0 |
| 4 | 3.6% | 10.6 | 0 | 0.7 |
| 8 | 20.2% | 29.1% | 76.8 | 59.8 |
| 16 | 73.0% | 71.8% | 99.7 | 98.8 |
| 30 | 99.5% | 97.6% | 99.8 | 99.2 |
| 50 | 99.8% | 99.3% | 99.9 | 99.3 |
| 100 | 99.9% | 99.8% | 99.9 | 99.4 |
| Pan | 100.0% | 100.0% | 100.0 | 100.0 |

It can be seen from Table III that better than 95% of the combusted bark particles passed a ¼" screen yet were retained on a No. 100 screen. Also, greater than 50% passed a No. 8, but were retained on a No. 16.

In the seive analysis shown in Table IV below, the samples were first dried overnight in an oven at 105° C.

TABLE IV

| | Percent Cumulative Retained | |
|---|---|---|
| U.S. Screen | Comb. Prod. "A" | Comb. Prod. "B" |
| 4 | 0.5 | 22.0 |
| 8 | 7.5 | 36.0 |
| 20 | 43.5 | 61.0 |
| 50 | 69.5 | 77.0 |
| 100 | 82.5 | 86.0 |
| Pan | 100.0 | 100.0 |

It can be seen from Table IV, that when dried, greater than about 70% of the combusted bark particles pass a No. 4 screen but are retained upon a 100, or even a No. 50. Also, greater that about 80% of the two samples tested in Table IV were retained on a No. 100. The screens used herein are U.S.A. Standard Testing Screens, meeting ASTM E11 specifications.

To lower the density and to improve the wetting characteristics of the wet compositions of the invention, small amounts of surface active agents may be used. The surface active agents useful herein are those which act as foaming agents and entrain air in the composition as it is mixed with water and allowed to set, or as it is mixed, pumped and sprayed. The entrained air not only lowers density but also assists the pumpability and sprayability of the wet mixes. Any of the surface active agents heretofore found useful in the art for this purpose in low density cementitious compositions are useful herein. In general, the surface active sulfonates have found particular utilization by the art. Alpha olefin sulfonates are preferred surface active foaming agents for use herein along with saponified or neutralized Vinsol resin. Vinsol resin is an extract of pinewood and a well known product of commerce. For use as a surface active agent the resin is neutralized typically with caustic alkali such as caustic soda. Another commercially popular surface active foaming agent for low density cementitious insulating compositions is sodium lauryl sulfate. A further operative surfactant giving stable air herein is "TRITON X-100", a condensate of octylphenol and ethylene oxide produced by Rohm & Haas Co. A sufficient amount of the surface active agent is employed herein to give the desired low density and/or degree of pumpability and sprayability. In general an amount of surfactant ranging from about 0.1 to about 2, preferably 0.2 to 0.5, percent by weight of the total solids of the composition is employed.

In order to maintain the air which is entrained during mixing, particularly after pumping the wet air-entrained mixture, and in order to keep the combusted bark aggregate in suspension and thus prevent segregation of the wet mix during pumping especially, a stabilizer such as a cellulose ether, starch or gum may be employed in the composition of the invention. Suitable cellulose ethers include methyl cellulose, hydroxyethyl cellulose, methyl hydroxyethyl cellulose, hydroxypropyl methylcellulose and sodium carboxymethylcellulose. Illustrative stabilizing starches include for example hydrated corn starch and pregelantinized starch, while exemplary gums include natural gums such as guar gum, karaya gum and xanthum gum. Only a small amount, about 0.1 to about 1.5, preferably 0.1 to about 0.5, percent by weight based on the total solids, of such stabilizer is typically needed.

Other optional but generally desirable additives to the compositions of the invention particularly for compositions to be utilized as sprayable fireproofings include reinforcing fibers such as abestos, chopped fiberglass, slag wool fibers, rock wool fibers, cellulose fibers, and mixtures thereof. High wet bulking cellulose fibers of the type described in U.S. Pat. No. 3,839,059 are particularly useful for increasing the yield of such fireproofing compositions. Exemplary cellulose fibers include wool fibers, sisal, hemp, cotton, jute, ramie, etc. Such reinforcing fibers may comprise from about 0.1 to about 15 percent by weight of the total solids of the dry composition.

A portion of the combusted bark particle aggregate employed in the compositions of the invention can be substituted by other lightweight open or porous aggregate materials which have been conventionally employed such as expanded vermiculite, expanded perlite, expanded clay, synthetic resin foam particles such as expanded polystyrene beads, etc.

The following are detailed non-limiting examples of compositions according to the invention.

EXAMPLE I

A composition having utility as a low density insulating composition and containing Portland cement binder, combusted bark particles and expanded vermiculite as lightweight aggregate components, and surfactant, was mixed in a Hobart-laboratory mixer with water. The combusted bark particles used were obtained from the same source as that of the combusted bark product "A" described above. The expanded vermiculite employed had a bulk density of approximately 6.9 lbs./cu.ft. The composition prepared and procedure was as follows:

|  | Grams/Batch | Wt. % of Solids |
| --- | --- | --- |
| Portland Cement | 712.0 | 60.3 |
| Combusted Bark | 372.0 | 31.5 |
| Expanded Verm. | 95.5 | 8 |
| Alpha-Olefin Sulf. | 2.0 | 0.17 |
| Water | 1500 | |

The above mixture was mixed for two minutes and yielded a product having a wet density of 49.8 lbs./cu.ft. and a calculated dry density of approximately 25 lbs./cu.ft. Three more grams of alpha olefin sulfonate surfactant were added to the wet mixture and after further mixing for one minute a product having a wet density of 41.2 lbs./cu.ft. and a calculated dry density of approximately 21 lbs./cu.ft. was obtained. Again, three grams of alpha olefin sulfonate were added to the wet mixture and after another minute of mixing the mix was allowed to stand for one minute yielding a product having a wet density of 41.6 lbs./cu.ft. and a calculated dry density of approximately 21 lbs./cu.ft. The calculated "yield" based upon total aggregate was 109%.

EXAMPLE II

Using the ingredients of Example I, with the exception that neutralized Vinsol resin was substituted as a surfactant, the following composition was prepared in a Hobart laboratory mixer:

|  | Grams/Batch | Wt. % of Solids |
| --- | --- | --- |
| Portland cement | 712 | 59.4 |
| Combusted bark | 372 | 31 |
| Expanded Verm. | 95.5 | 8 |
| Neutralized Vinsol | 19 | 1.6 |
| Water | 1500 | |

The above was mixed for two minutes and allowed to stand for one minute yielding a product having a wet density of 34 lbs./cu.ft. After standing for three minutes the wet density of the product was 34.3 and its calculated dry density was approximately 17 lbs./cu.ft.

EXAMPLE III

Using the ingredients of Example II but omitting the expanded vermiculite, the following composition was prepared in a Hobart laboratory mixer:

|  | Grams/Batch | Wt. % of Solids |
| --- | --- | --- |
| Portland cement | 712 | 64.6 |
| Combusted bark | 372 | 33.7 |
| Neutralized Vinsol | 19 | 1.7 |
| Water | 1453 | |

The above was mixed for two minutes and allowed to stand for three minutes yielding a product having a wet density of 45.3 lbs/cu.ft., and a calculated dry density of approximately 22 lbs./cu.ft.

EXAMPLE IV

Using the ingredients of the previous Examples, the following composition was mixed in a large paddle mixer and pumped. The combusted bark particles used were wet, that is contained 33.3 lbs. of water which was calculated as part of the total mix water used.

|  | Lbs./Batch | Wt. % of Solids |
| --- | --- | --- |
| Portland cement | 125.4 | 65.45 |
| Combusted bark | 65.3 | 34.08 |
| Alpha olefin sulf. | 0.88 | .47 |
| Water | 304 | |

The above was mixed for two minutes yielding a product having a wet density of 49.9 lbs./cu.ft. and 54.6 lbs./cu.ft. after pumping. The calculated dry density of the product after pumping was approximately 24 lbs./cu.ft.

EXAMPLE V

Using the ingredients of Example IV with the exception that dry combusted bark was employed, the following composition was mixed in a large paddle mixer and pumped:

|  | Lbs./Batch | Wt. % of Solids |
| --- | --- | --- |
| Portland cement | 62.7 | 64.53 |
| Combusted bark | 34 | 35.02 |
| Alpha olefin sulf. | 0.44 | .45 |
| Water | 131.6 | |

The above was mixed for two minutes yielding a product having a wet density of 42.3 lbs./cu.ft. and 43.8 after pumping. The calculated dry density of the pumped product was approximately 21 lbs./cu.ft.

EXAMPLE VI

Using the ingredients of the previous Examples, the following composition was mixed in a large paddle mixer and pumped:

|  | Lbs./Batch | Wt. % of Solids |
| --- | --- | --- |
| Portland cement | 62.7 | 67.93 |
| Combusted bark | 16 | 17.33 |
| Expanded verm. | 13.3 | 14.40 |
| Alpha Olefin sulf. | 0.3 | .33 |
| Water | 131.6 | |

The above was mixed for two minutes yielding a product having a wet density of 45.6 lbs/cu.ft. and 46.7 lbs./cu.ft. after pumping. The calculated dry density of the pumped product was approximately 22 lbs./cu.ft.

EXAMPLE VII

A number of compositions containing gypsum plaster, combusted bark aggregate, reinforcing fibers, surfactant and stabilizers were formulated as low density fireproofings, for example for protecting structural steel beams, etc. The following Table lists compositions considered typical of those formulated which were mixed, pumped and sprayed using a "Moyno" pump and plasterer's spray gun. Observations of the operations are listed also. In the listed compositions a hemihydrate gypsum plaster was used as a binder. The combusted bark particles were obtained from the source from which the bark aggregate used in previous Examples was obtained. Both cellulose fibers and glass fibers were used for reinforcement. The cellulose "F" component comprised unbleached sulphite pulp, while the cellulose "B" product comprised shredded newsprint. Alpha olefin sulfonate or mixture with "TRITON X-100" was again used as an air-entraining surfactant. The stabilizing component was hydroxypropyl methylcellulose ("METHOCELL 228", a product of Dow Chemical Co.) or hydroxyethyl cellulose ("NATROSOL 250H", a product of Herclues, Inc.) All of the compositions after pumping and spraying exhibited dry densities in the range of about 17 to about 31 lbs./cu.ft., with all but two exhibiting dry densities in the 18 to 25 lbs./cu.ft. range.

TABLE V

| COMPONENT | A | B | C | D | E | F | G | H | I | J | K | L | M | N | O | Q | R | S | T | U |
|---|---|---|---|---|---|---|---|---|---|---|---|---|---|---|---|---|---|---|---|---|
| Gypsum | 600 | 700 | 700 | 700 | 700 | 700 | 700 | 700 | 700 | 700 | 700 | 700 | 700 | 700 | 700 | 700 | 700 | 700 | 700 | 700 |
| Comb. Bark | 400 | 510 | 400 | 400 | 300 | 200 | 200 | 100 | 300 | 300 | 100 | 200 | 200 | 200 | 400 | 400 | 400 | 400 | 400 | 400 |
| Cellulose | 40(B) | 140(F) | 150(F) | 150(F) | 150(F) | 100(F) | 150(F) | 150(F) | 100(F) | 125(B) | 125(B) | 100(F) | 100(B) | 70(B) | 75(F) | 75(F) | 75(F) | 75(F) | 75(F) | 40(B) |
| Alpha-Olefin Sulf. | 5 | 5 | 5 | 5 | 5 | 5 | 5 | 5 | 5 | 5 | 3 | 3 | 3 | 3 | 3 | 3 | 3 | 3 | 3 | 3 |
| Glass Fiber | 5 | 5 | 5 | 5 | 5 | 5 | 5 | 5 | 5 | 5 | 3 | 5 | 5 | 5 | 5 | 5 | 5 | 5 | 5 | 5 |
| TRITON X-100 | 15 | 20 | 20 | | | | | | | | | | | | | | | | | |
| Methocell 228 | | | 5 | 5 | 5 | 5 | 5 | 5 | 5 | | 3 | | | | | | | | | |
| Natrosol 250H | | | | | | | | | | | | | | | | | | | | |
| Water | 2000 | 2200 | 2420 | 2420 | 2230 | 1460 | 1830 | 1495 | 1560 | 1873.5 | 1750 | 1400 | 1600 | 2810 | 1460 | 1700 | 1800 | 2000 | 1900 | 2380 |
| Comments | Segregated | Segregated | Pumped Satisf. with Scallop Mixer | Satisfactory | Soupy | Soupy | Soupy | Soupy | No Segreg. not enough water | Satisfactory | Satisfactory | Satisfactory | Did not Pump | Slowed pump | Did not pump | Did not pump | Did not pump | Fair | Good | Segregated due to cellulose |

It is claimed:

1. A hydratable composition which when mixed with water and allowed to hydrate hardens to a low density mass comprising a hydratable inorganic binder in admixture with from about 1 to about 50 percent by weight based on said composition of a lightweight aggregate comprised of combusted bark particles obtained by partially combusting essentially the bark, in particulate form, removed from logs in a furnace.

2. The composition of claim 1 wherein said bark particles possess a dry bulk density of less than about 17 pounds per cubic foot.

3. The composition of claim 1 wherein said bark particles exhibit a particle size substantially such that better than about 70 percent of the particles pass a No. 4 U.S. screen, but are retained on a 100 U.S. screen.

4. The composition of claim 1 wherein the amount of said bark particles present in said composition ranges between about 15 to about 35 percent by weight.

5. The composition of claim 1 wherein said inorganic binder is Portland cement, gypsum or mixture thereof.

6. The composition of claim 1 additionally including a surface active agent.

7. The composition of claim 6 wherein said surface active agent is a sulfonate.

8. The composition of claim 7 wherein said surface active agent is an alpha olefin sulfonate.

9. The composition of claim 1 to which is added water.

10. A hydratable composition which when mixed with water and allowed to hydrate hardens into a mass having a density of less than about 45 pounds per cubic foot, comprising a hydratable inorganic binder in admixture with a lightweight aggregate comprised of combusted bark particles recovered from the flue gases produced in a boiler furnace during the partial combustion of essentially bark removed from logs, the bark being combusted while in the form of particles of less than about 1 to 2 inches in size.

11. The composition of claim 10 additionally containing a surface active agent.

12. The composition of claim 10 additionally containing expanded vermiculite or perlite.

13. The composition of claim 10 additionally containing a stabilizer selected from the group consisting of cellulose ethers, starches, gums, or mixtures thereof.

14. The composition of claim 10 additionally containing reinforcing fibers.

15. A hydratable composition which when mixed with water and allowed to hydrate hardens to a low density mass comprising a hydratable inorganic binder in admixture with from about 1 to about 50 percent by weight based on said composition of a lightweight comprised of combusted bark particles obtained by partially combusting essentially the bark, in particulate form, removed from logs in a furnace, from about 0.1 to about 2 percent by weight of said composition of a surface active agent, from about 0.1 to about 1.5 percent by weight of said composition of a stabilizing component selected from the group consisting of cellulose ethers, starches, gums and admixtures thereof, and from about 0.1 to about 15 percent by weight of said composition of reinforcing fibers.

16. The composition of claim 15 to which is added water in a weight ratio of water to solids of about 1 to 2.

17. The composition of claim 15 to which is added additional lightweight aggregate selected from the group consisting of expanded vermiculite, expanded perlite, expanded clay, synthetic resin foam particles, and mixtures thereof.

18. The composition of claim 15 wherein said reinforcing fiber is cellulose fiber.

19. The composition of claim 15 wherein said stabilizer is hydroxypropyl methylcellulose, hydroxyethyl cellulose or mixture thereof.

20. The composition of claim 15 wherein said surface active agent is alpha-olefin sulfonate, neutralized Vinsol resin, a condensate of octyl phenol and ethylene oxide, or mixture thereof.

21. A hydrated mass obtained by mixing water with the composition of claim 15 and thereafter allowing the wet mixture to dry.

22. The hydrated mass of claim 16 wherein the density of the mass after drying is less than about 45 pounds per cubic foot.

23. The hydrated mass of claim 16 wherein the density of the mass after drying is in the range of from about 10 to about 30 pounds per cubic foot.

* * * * *